United States Patent Office 2,699,854
Patented Jan. 18, 1955

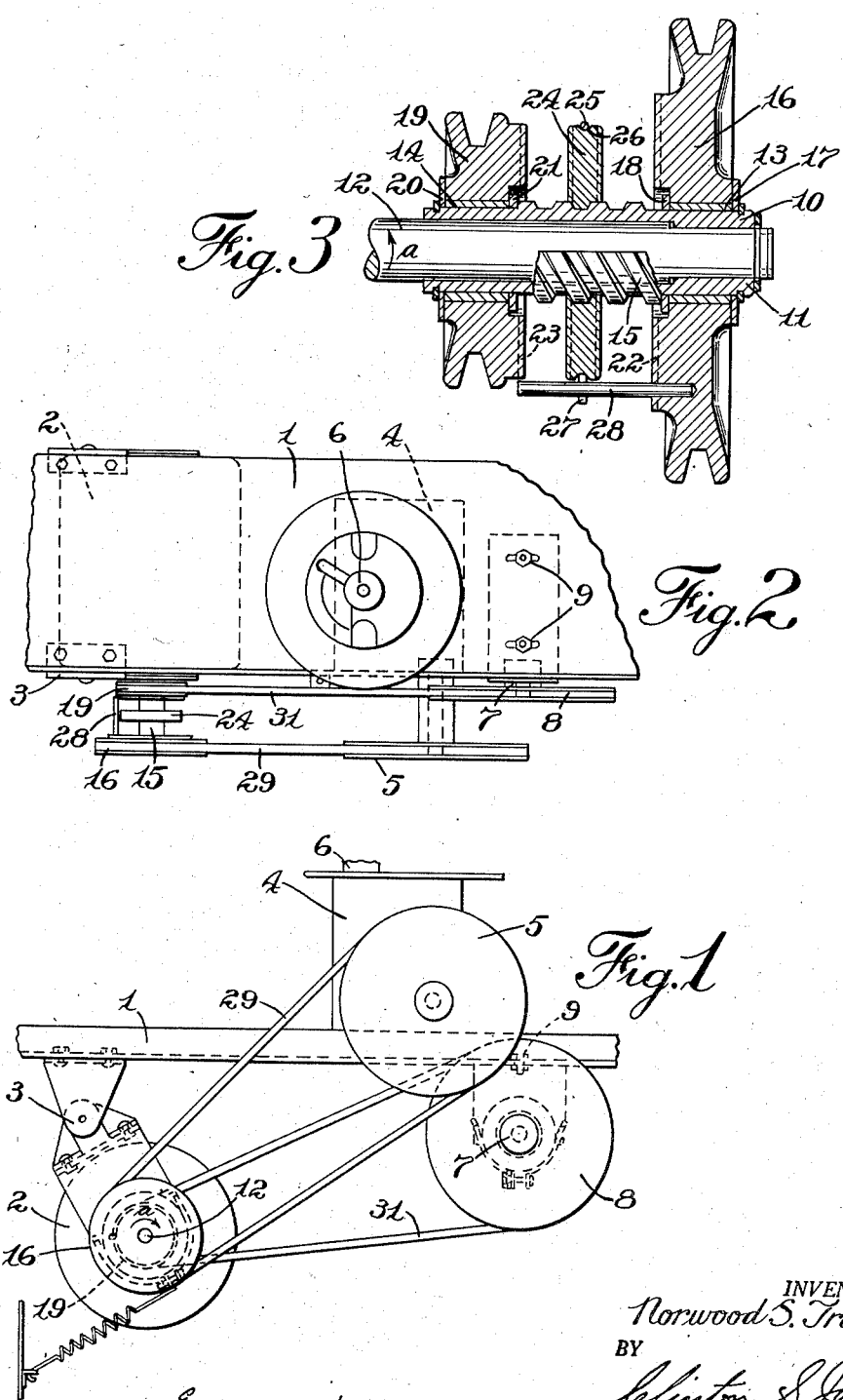

2,699,854

MULTIPLE DRIVE FOR WASHING MACHINES

Norwood S. Trout, Jr., Elmira, N. Y., assignor to Bendix Aviation Corporation, a corporation of Delaware Application August 1, 1949, Serial No. 107,990

1 Claim. (Cl. 192—51)

The present invention relates to a multiple drive for washing machines and more particularly to an automatically shiftable transmission for alternatively connecting an agitator operating means and a pump operating means to a single source of power such as an electric motor. It includes a further adaptation of some of the principles disclosed in applicant's prior Patent 2,456,600, issued December 14, 1948.

It is an object of the present invention to provide a drive of the above type which is efficient and reliable in operation and simple and economical in construction.

It is another object to provide such a device in which the power source is reversible, and rotation in one direction actuates the transmission to connect the power source to one of the load devices, while rotation in the opposite direction automatically disconnects the first load device and connects the other load device to the power source.

It is a further object to provide such a device in which the transmission includes a lost-motion connection which permits the power source to accelerate freely for about two revolutions after each reversal before the load is connected.

Further objects and advantages will be apparent from the following description taken in connection with the accompanying drawing in which:

Fig. 1 is a side elevation of a portion of the operating mechanism of a washing machine comprising a preferred embodiment of the invention;

Fig. 2 is a top plan view of the same; and

Fig. 3 is an enlarged sectional detail of the automatically shiftable transmission means.

In Fig. 1 of the drawing there is illustrated a frame member 1 under which a power source in the form of an electric motor 2 is hung by means of a pivotal bracket 3. Transmission means 4, including a pulley 5 for actuating an agitator shaft 6 is suitably mounted on top of the frame member 1, and a pump actuating means 7 including a pulley 8 is mounted beneath the frame member 1 with provision for attachment as indicated at 9 in Fig. 2.

Means alternatively operating the agitator pulley 5 and the pump pulley 8 from the motor 2 is provided comprising a hollow screw shaft 10 (Fig. 3) which is non-rotatably mounted as indicated at 11 on the extended armature shaft 12 of the motor. Screw shaft 10 has smooth terminal bearing portions 13 and 14 and an intermediate threaded portion 15. Agitator drive pulley 16 is journalled on the bearing portion 13 between thrust bearings 17 and 18, and a pump drive pulley 19 is journalled on the bearing portion 14 of the screw shaft between thrust bearings 20 and 21 thereon. Pulleys 16 and 19 are provided with clutch surfaces 22 and 23 respectively, facing each other adjacent the ends of the intermediate threaded portion 15, and a cooperating clutch member 24 is threaded on said intermediate portion for longitudinal movement into alternative engagement with the clutch pulleys 16, 19.

Means are provided, similar to that disclosed in applicant's prior patent above cited, for causing traversal of the threaded clutch member 24 along the screw shaft 10 in one direction or the other, depending upon the direction of rotation of the screw shaft. This means comprises a split spring ring 25 located in and frictionally embracing a peripheral groove 26 of the clutch member 24 and having a radial projection 27 on one end adapted to abut against a pin 28 rigidly mounted in the clutch pulley 16 and extending axially thereof into proximity to the clutch pulley 19.

The agitator drive pulley 16 is connected to the pulley 5 of the agitator driving means by means of a belt 29, and the pump drive pulley 19 is connected to the pulley 8 of the pump mechanism by means of a belt 31.

The pitch of the thread on the intermediate portion 15 of the screw shaft is so selected that when the clutch member 24 is traversed by the rotary screw shaft into engagement with either of the clutch pulleys 19 or 16 by virtue of the frictional drag of the spring ring 25, the clutch surfaces will be pressed together by the longitudinal component of the driving force transmitted by the screw shaft so causing the clutch pulley to rotate with the threaded clutch member. The length of the threaded portion 15 is preferably such that the threaded clutch member 24 will make substantially one revolution on the shaft in moving from one clutch pulley to the other. An additional lost motion is provided by the fact that the projection 27 of the spring ring 25 merely abuts against the pin 28 and is not attached thereto. There is thus an additional lost motion of almost one complete revolution of the threaded clutch member 24 and the drag ring 25 before the drag ring becomes effective to initiate traversal of the threaded clutch member at each reversal of the transmission.

In operation, rotation of the motor 2 in the direction of the arrow (a) in Figs. 1 and 3 causes the screw shaft 10 and threaded clutch member 24 to rotate in a clockwise direction in Fig. 1 until the projection 27 on the end of the spring strikes the pin 28 on clutch pulley 16. The rotation of the threaded clutch member 24 is thereupon resisted by the drag spring 25 so that the clutch member traverses on the rotating screw shaft to the right in Fig. 3 into engagement with the clutch pulley 16, whereupon since its longitudinal movement is thus arrested, pulley 16 is constrained to rotate with the screw shaft, driving the agitator pulley 5 to actuate the agitator shaft 6.

After completion of the washing operation reversal of the motor 2 causes the screw shaft 10 and threaded clutch member 24 to rotate in a counter-clockwise direction as viewed in Fig. 1, the clutch member 24 freeing itself from the clutch pulley 16, and as soon as the projection 27 of the drag spring is rotated one revolution so as to be again arrested by the pin 28, the threaded clutch member 24 is traversed to the left in Fig. 3 until it engages the clutch pulley 19, which is thereupon driven so as to operate the pump pulley 5.

The accumulative lost motion provided by the traversal of the threaded clutch member 24 on the screw shaft and by the lost motion connection between the drag spring 25 and the pin 28, amounting substantially to two complete revolutions of the motor shaft, allows the motor shaft to accelerate to a substantial speed before the load is picked up by the transmission. When the motor 2 is of the alternating current type, which is commonly the case, this permits the motor to get under way sufficiently to bring its normal running windings into operation prior to the application of the load.

It will be noted that the spring drag ring 25 is wound on the threaded clutch member 24 in such a direction that the drag spring tends to wind down on said clutch member when the screw shaft 10 is rotated in the direction to cause traversal of the threaded clutch member 24 into engagement with the clutch pulley 16 which carries the pin 28. In other words, the projection 27 is drawing the spring after it, placing it under tension which causes it to wind down and grip the clutch member. Thus, when the agitator is being driven, there is no slip of the drag spring 25 on the threaded clutch member. When the pump is being driven, however, due to the reversal in the direction of rotation of the screw shaft, the projection 27 is pushing the spring, which tends to make it open up or unwind and release said clutch member.

Although but one embodiment of the invention has been shown and described in detail, it will be understood that other embodiments are possible and changes may be made in the design and arrangement of the parts without departing from the spirit of the invention.

I claim:

In a multiple drive for washing machines and the like, a power source having a reversible driving shaft, a hollow screw shaft fixed thereon and having a central threaded portion and a smooth bearing portion at each end, a driven clutch member journaled on each said bearing portion of the screw shaft and in fixed axial relation to the opposite ends of the intermediate threaded portion, a cooperating driving member threaded on the intermediate portion of the shaft for axial transverse movement between the two driven clutch members, means for controlling transversal of the driving clutch member into engagement with each of the driven clutch members responsive to the direction of the rotation of the screw shaft, said means comprising a friction drag spring ring bearing on the periphery of the driving clutch member, said ring having a radial projection, and a pin projecting from the side of one of the driven clutch members and coextensive in length with the central threaded portion, and in a position to engage said ring projection and prevent rotation, while permitting axial movement of the spring ring along with the driving clutch member to provide nearly a full revolution of lost motion in addition to the lost motion of the driving clutch member on the screw shaft before the friction ring is effective to close the active clutch member after reversal of the rotation of the screw shaft.

References Cited in the file of this patent

UNITED STATES PATENTS

| | | |
|---|---|---|
| 378,088 | Foote | Feb. 21, 1888 |
| 1,170,653 | Marette | Feb. 8, 1916 |
| 1,974,784 | Pilcher | Sept. 25, 1934 |
| 2,158,873 | Kaltwasser | May 16, 1939 |
| 2,441,926 | Zahn et al. | May 18, 1948 |
| 2,456,600 | Trout, Jr. | Dec. 14, 1948 |

FOREIGN PATENTS

| | | |
|---|---|---|
| 66,725 | Sweden | May 18, 1927 |